Jan. 16, 1951

F. M. DAVIS

RADIO COMMUNICATION TRANSMITTING AND RECEIVING COMBINATION 2,537,972

Filed Aug. 11, 1944

6 Sheets-Sheet 1

Inventor:
Frank M. Davis,
By Chritton, Wiles, Schroeder & Merriam,
Att'ys.

Inventor:
Frank M. Davis,
By Chritton, Wiles, Schroeder & Merriam,
Attys

Jan. 16, 1951

F. M. DAVIS

RADIO COMMUNICATION TRANSMITTING AND RECEIVING COMBINATION 2,537,972

Filed Aug. 11, 1944

6 Sheets-Sheet 3

Inventor:
Frank M. Davis,
By Chritton, Wiles, Schroeder & Merriam,
Attys.

Inventor:
Frank M. Davis,
By Chritton, Wiles, Schroeder & Merriam,
Attys.

Jan. 16, 1951

F. M. DAVIS

RADIO COMMUNICATION TRANSMITTING AND RECEIVING COMBINATION 2,537,972

Filed Aug. 11, 1944

6 Sheets-Sheet 5

Inventor:
Frank M. Davis,
By Clinton, Wiles, Schroeder & Merriam,
Attys.

Jan. 16, 1951 F. M. DAVIS 2,537,972

RADIO COMMUNICATION TRANSMITTING AND RECEIVING COMBINATION

Filed Aug. 11, 1944 6 Sheets-Sheet 6

Inventor:
Frank M. Davis,
By Chritton, Wiles, Schroeder & Merriam,
Attys.

Patented Jan. 16, 1951

2,537,972

UNITED STATES PATENT OFFICE 2,537,972

RADIO COMMUNICATION TRANSMITTING AND RECEIVING COMBINATION

Frank M. Davis, Cedar Rapids, Iowa, assignor to Collins Radio Company, a corporation of Iowa Application August 11, 1944, Serial No. 548,978

13 Claims. (Cl. 250—13)

This invention relates to a radio transmitting and receiving combination, and more particularly to a system using a common tunable oscillator for both transmission and reception.

Figure 1:
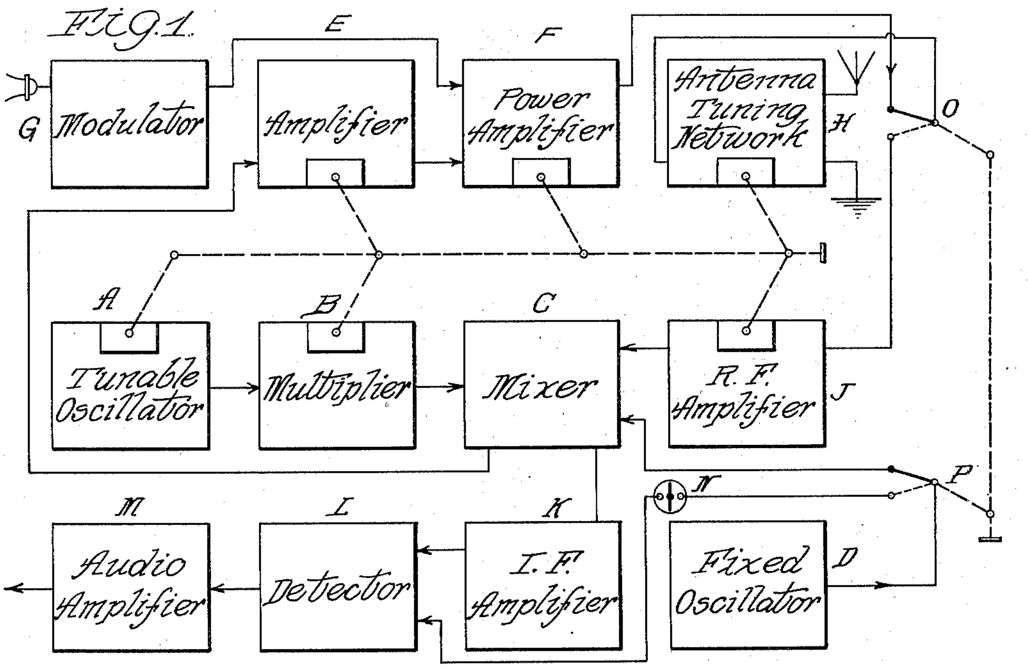
Figure 2:
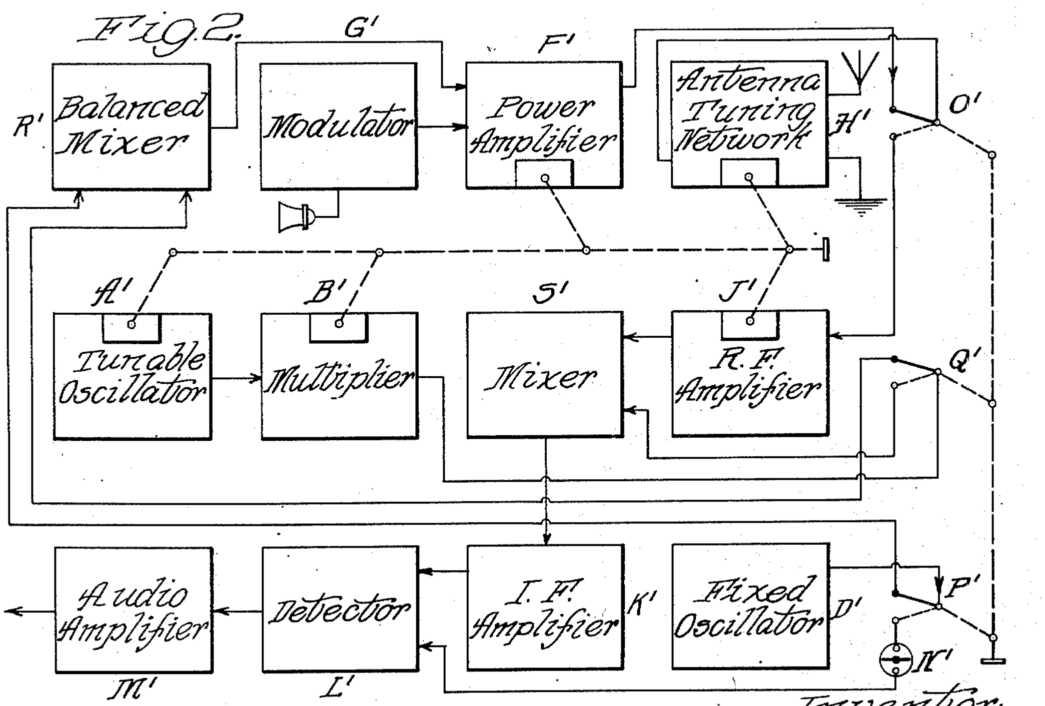

One feature of this invention is that it provides an improved radio combination system for transmitting and receiving; another feature of this invention is that a single tuning means effects coordinated selection of the desired frequency in both the transmitting and receiving portions of the system; still another feature of this invention is that transmission and reception on the same frequency are ensured despite variation of the tunable oscillator from its calibrated frequencies; yet another feature of this invention is that the system is quickly and conveniently tunable to any desired frequency in any of a plurality of frequency ranges, so that transmission and reception on such frequency may be effected; a further feature of this invention is that spurious frequencies are minimized; still a further feature is that antenna tuning and loading adjustments may be made with the transmitter inactive, ensuring transmission at or near peak power immediately upon coming on the air; and yet a further feature of this invention is that the tunable oscillator may be used to provide a beat note for CW reception. Other features and advantages of this invention will be apparent from the following specification and the drawings, in which:

Figure 1 is a block diagram of one system embodying my invention; Figure 2 is a block diagram of an improved form of a system basically similar to that shown in Figure 1; Figure 3, comprising the portions *3a* and *3b*, is a circuit diagram of an operable embodiment of a transmitter-receiver combination system corresponding to the block diagram of Figure 2; Figure 4 is a block diagram of a preferred embodiment of my invention; and Figure 5, comprising the portions *5a*, *5b* and *5c*, is a circuit diagram of an operable embodiment of a transmitter-receiver combination system corresponding to the block diagram of Figure 4.

Two-way radio communication is becoming of increasing importance, and under many circumstances it is desirable to have the transmitting and receiving equipment tunable over a desired frequency range, or a plurality of frequency ranges. Under such conditions the transmitted frequency cannot be crystal controlled, but must have a frequency controlled by a tunable oscillator tank circuit. Despite the greatest care in design and construction, an oscillator tank circuit undergoes frequency changes as the result of its exposure to variations in temperature, humidity, etc., and this makes it difficult to determine accurately, by any system of dial calibration, the frequency being transmitted or received, particularly in the higher frequency bands, as those used in aircraft work.

I have devised and am here disclosing a single-control (in so far as tuning is concerned) radio transmitting and receiving combination system wherein transmission and reception on the same frequency are ensured. This enables an operator to tune in on another station which is transmitting, and then to go on the air himself as soon as the other station ceases transmission with full assurance that his signal is on the same frequency as that on which the other station was transmitting, regardless of the setting of his tuning dial or the accuracy of its calibration. I am here disclosing several systems for accomplishing the desired results, all of these systems making use of the same tunable oscillator in both transmission and reception. In the systems shown in Figures 1–3, the tunable oscillator is used directly for one operation (either transmission or reception), and in combintion with a fixed frequency oscillator in the other operation. In the systems shown in Figures 4 and 5, one multiple of the oscillator frequency is used during transmission and a different multiple during reception. In connection with all of these systems, the desired wave is amplified and transmitted in the one case; while in the other case, in order to receive on the same frequency, the different or displaced frequency generated by means including the tunable oscillator is used as the local or heterodyning wave of a super-heterodyne receiver having its intermediate frequency amplifier tuned to a frequency representing the difference between the initial or transmitted frequency and the displaced frequency.

The basic concept of having a single tunable oscillator operating as all or part of the wave generating means during both transmission and reception is capable of embodiment not only in the systems shown here, but also in other systems ensuring transmission and reception upon the same frequency provided the tunable oscillator is left at the same setting. Other systems for accomplishing this purpose are to be found in my own co-pending application Ser. No. 524,205, filed Feb. 28, 1944, Patent No. 2,402,606, issued June 25, 1946, with claims to a different specific system not in this application; and in the co-pending applications of Arthur A. Collins, Ser. No.

524,204, filed February 28, 1944, Patent No. 2,447,490, issued August 24, 1948, and of Melvin L. Doelz, Ser. No. 524,206, Patent No. 2,457,134, issued December 28, 1948, filed February 28, 1944; and certain features disclosed and originally claimed here are the subject matter of my divisional application Serial No. 685,934, filed July 24, 1946.

My basic concept is to provide radio apparatus comprising, as its principal elements, variable wave generating means for providing desired waves of an initial frequency variable over a predetermined range, or a plurality of ranges; means associated with and including said wave generating means for providing other desired waves of a frequency displaced from said initial frequency but bearing a predetermined relation thereto; means for amplifying and transmitting one of the desired waves, as that on the initial frequency; and a super-heterodyne receiving system having an intermediate frequency amplifier tuned to the difference between the frequencies of the two desired waves, the other of said desired waves, as the displaced frequency waves, serving as the local heterodyning waves for the receiving system. Where the relation between the initial and displaced frequencies is one of a fixed frequency differential, the intermediate frequency amplifier of the receiving system is tuned to this fixed frequency. Where the relation between the initial and displaced frequencies is a matter of fixed percentage of the initial frequency, and thus varies in absolute frequency with variation in the initial frequency, the intermediate frequency amplifier of the receiving system is tunable over a range determined by the range of tuning of the variable wave generating means, and the tuning of the intermediate frequency amplifier and the wave generating means are ganged. In any event, when one has ceased listening to a given signal or a given frequency, switching over to transmission without touching the tuning control ensures sending on the exact frequency of the signal previously heard regardless of any differences between actual oscillator frequency and dial calibration; and conversely, when one has ceased transmitting, switching over to reception (which effects the desired displacement of frequency among other things) without touching the tuning control ensures reception on the exact frequency being previously transmitted. The advantages in two-way communication at any of a large number of frequencies throughout one or more bands is obvious.

While I am terming the systems disclosed here "single-control systems," it will be understood that this merely means that there would be only a single tuning control for both the transmitting and receiving portions of the radio apparatus, which would normally be housed in a single cabinet. In addition, of course, a commercial set would include a band switch, antenna coupling and loading controls, an on-off switch or several of such switches, a beat frequency oscillator control, a manual volume control for the receiving portion of the system, etc. The switch-over from transmission to reception would normally be effected by a keying relay, or by a push-button-operated relay associated with the microphone of the transmitter. With a system of this kind no matter how inexperienced the operator may be, once he finds and hears a given station (whether it be another airplane, a ground station or the like) he is sure to be able to talk to it, sure to be on the frequency to which the receiver of that other station is tuned. Another advantage is that this system enables the same antenna tuning and loading circuit to be used for coupling both the transmitter and receiver to the antenna, so that the antenna can be tuned during reception, without breaking radio silence, with assurance that transmission will be at or very near maximum possible power immediately upon initiation of transmission, without loss of time for adjustment of the antenna tuning and loading controls after transmission has been started, this being one of the features claimed here.

In the particular embodiment of my invention illustrated in the block diagram of Figure 1, a tunable oscillator A delivers its output to a multiplier B, to provide wave bands over which the set may work, the oscillator and multiplier comprising means for generating waves of any desired frequency in any of a plurality of bands, the multiplier (in practice comprising a plurality of multiplying sections) providing an output which bears a relation to the oscillator output resulting from multiplication by a factor which may be anything from unity to about twenty. The output of the multiplier B is delivered to a mixer C where it may be combined with the wave output of a fixed oscillator D, or not, as may be desired. In the particular system illustrated the wave output of the multiplier B and that of the fixed oscillator D are combined during transmission. One of the resultant waves in the output of the mixer (as, for example, a frequency equaling the sum of the frequencies provided by the multiplier and the fixed oscillator) is delivered to an amplifier E. The output of this amplifier is delivered to the power amplifier F here shown as having its output varied by action of the modulator G in accordance with voice sounds supplied to the microphone associated with this modulator, for example. During transmission the modulated output of the power amplifier F is delivered to the antenna tuning and loading network here identified as H and then supplied to an appropriate antenna system.

Change-over between transmission and reception is here shown as accomplished by two movable two-position switches identified as O and P. The switch O has its movable element connected to the antenna and its tuning and loading network, and is adapted selectively to make connection either with the output of the power amplifier F for transmission (the switches being shown in the transmitting position in solid lines and in the receiving position in dotted lines), or to an RF amplifier J, forming part of the receiving system, during reception. The switch P has its movable element connected to the output of the fixed oscillator D, and is arranged to connect this to the mixer C during transmission, and to connect it to the detector L of the receiving system, through an on-off switch N, so that the fixed oscillator may be used as a beat frequency oscillator during tuning or during code reception.

When the change-over switches O and P are in their other or dotted line positions, the transmitting portion of the system is disconnected from the antenna and this and its tuning and loading network are connected to the input of the radio frequency amplifier J as mentioned before. The output of this amplifier is delivered to the mixer C where it is heterodyned with the wave produced by the tunable oscillator and multiplier B, the wave from the fixed oscillator D being no longer supplied to the mixer C. The output of the mixer C is then delivered to the intermediate frequency amplifier K which would, in this case, be fixedly tuned to the frequency of the fixed oscillator D. The output of the intermediate frequency amplifier is delivered, in conventional manner, to the detector L and an audio amplifier M, and then to any conventional translating means (not shown), as a speaker or earphones. In order to simplify control of the radio apparatus, the change-over switches are ganged, as indicated; and all of the necessary tuning controls, as those in the portions identified as A, B, E, F, H and J, are also ganged so that tuning may be effected by a single control knob. The particular tuning referred to in this latter case, of course, is tuning of the variable reactance element in each of the tank circuits, as different fixed reactance elements may be used in various tank circuits in different bands, switching between bands being effected in conventional manner with a band switch, not shown.

For the purpose of illustrating the operation of such a system as that shown in Figure 1, it may be assumed that the tunable oscillator A is so designed as to provide waves of a frequency variable over a range from 1,000 to 1,500 kc.; and that the multiplier B is adapted to pass the waves with a unity multiplication factor, to double their frequency, or to triple it. This would provide three bands, one being from 1 to 1½ megacycles, another from 2 to 3 megacycles, and the third from 3 to 4½ megacycles, speaking with respect to the output of the multiplier B. An appropriate frequency for the fixed oscillator D is 455 kc. If it be assumed that the frequency during transmission is the arithmetical sum of the multiplier output frequency and the fixed oscillator frequency, it will thus be seen that the transmission bands covered would be 1,455 kc. to 1,955 kc. as the first band; 2,455 kc. to 3,455 kc. as the second band; and 3,455 kc. to 4,955 kc. as the third band.

If we then assume that the tunable oscillator is tuned to its lowest frequency of 1,000 kc., and the tuned circuits in the multiplier are so chosen that the multiplication factor is unity, it will be apparent that transmission will take place on 1,455 kc. When the operator has finished transmitting he may, without touching the tuning control, switch over from transmission to reception merely by the automatic operation of the relay effecting ganged or synchronized operation of the change-over switches P and O. Throwing of these switches to the dotted line position would disconnect the fixed oscillator from the mixer C and connect the antenna system to the input of the RF amplifier J. A 1,455 kc. signal coming into the RF amplifier would then be heterodyned in the mixer C with the 1,000 kc. waves supplied by the multiplier B, and the difference between these frequencies would be 455 kc. It is thus obvious that if the intermediate frequency amplifier K is fixedly tuned or peaked to a 455 kc. frequency, the same frequency as that of the fixed oscillator D, the signals received will be exactly on the same frequency as those transmitted. The fixed oscillator D can be very highly stabilized, by use of a crystal or otherwise; and any differences between the actual and dial frequencies of the tunable oscillator are identical on both transmission and reception. Moreover, when the change-over switch P is in the reception position, closing of the switch N enables the fixed oscillator D to be used as a beat note oscillator is desired. By use of this beat note oscillator tuning to a received signal can be very accurately effected, as it is only necessary to tune until there is zero beat with the desired signal; or, if code is being received, the tuning control can be operated to detune very slightly (say 500 to 1,000 cycles), whereupon the fixed oscillator D will provide the desired beat note.

It will thus be seen that the wave generating means comprising the tunable oscillator A and the multiplier B together with the fixed oscillator D, provides an initial frequency, for transmission, of 1,455 kc. The waves to be transmitted are what may be termed one set of desired waves; and the waves to be used as local heterodyning waves for reception may be termed the other set of desired waves. This other frequency is effected merely by cutting out the fixed oscillator D upon change-over from transmission to reception, this displacing the frequencies of the locally generated waves from 1,455 kc. to 1,000 kc. In the particular situation here described, and in the system illustrated in Figure 1, the displacement is a fixed frequency displacement regardless of the initial setting or frequency of the tunable oscillator A. In this regard it will be understood that the word "displacement" is intended broadly to cover either an increase or a decrease of frequency. For convenience of description, the frequency used for transmission is being termed the "initial" frequency, and the different frequency used for local heterodyning purposes during reception is being termed the "displaced" frequency, although these words are intended broadly enough, in the claims, to include a situation wherein the local frequency during reception might be termed the "initial" frequency and that used for transmission the "displaced" frequency. Moreover, while a separate fixed oscillator is shown as the means for displacing the frequency of the desired waves, it will be understood that this can be accomplished in other ways. In the system shown in Figure 1, for example, the fixed oscillator D could be eliminated and the RF amplifier could be caused to oscillate during transmission to provide the desired additional frequency source. Also, as is shown in the systems hereinafter to be described and in the systems forming the subject matter of the other co-pending applications mentioned earlier, the displacement of the frequency of the desired waves can be effected in a number of different ways. My basic concept lies in using the same tunable oscillator as part of wave generating means providing one desired frequency for transmission and another desired frequency as the local heterodyning wave for reception, there being a predetermined relation between the initial and displaced frequencies.

During reception, under the conditions assumed above, the received frequency is a function of the fixed frequency derived from the fixed oscillator D and a frequency which is some multiple of the frequency to which the tunable oscillator A is tuned. At certain points in the tuning range in each band, unless great care is taken in the selection of the frequencies and the width of the bands, the reception frequency will heterodyne with some other multiple of the basic tunable oscillator frequency. The system is operable without such heterodyne interference during reception, if the fixed oscillator frequency is chosen such that it is considerably less than the minimum frequency of the tunable oscillator. Under these conditions, however, the transmitter will have certain spurious radiations, the more serious being radiations at the multiplier output frequency plus or minus multiples of the fixed oscillator frequency.

I find that the operation of a system such as described in Figure 1 can be considerably improved by combining the multiplier output waves and the fixed oscillator waves, during transmission, in a balanced mixer so designed that the spurious radiations mentioned in the preceding paragraph (multiplier output plus or minus multiples of the fixed oscillator frequency) are balanced out; by working the mixer tubes substantially above cut-off level; and by designing the fixed oscillator to be as free of harmonics as possible. A system of this type, basically similar to but representing an improvement on the system just described, is illustrated in block diagram form in Figure 2 and in circuit diagram form in Figure 3.

Referring now more particularly to the block diagram comprising Figure 2, it will be seen that the system there shown is basically similar to that shown and described earlier, and the description of Figure 2 will therefore be kept brief. In the system in this latter figure a tunable oscillator A′ supplies waves variable over a certain frequency range to a multiplier B′ enabling the set to cover different bands. The output of the multiplier B′ is connected to the movable element of a two-position switch here identified as Q′, this switch being ganged with the other two change-over switches O′ and P′ associated with the antenna tuning network H′ and the fixed oscillator D′, respectively. When the switch Q′ is in transmitting position, as is shown in solid lines, the output of the multiplier B′ is delivered to the balanced mixer R′, where it is combined with waves delivered from the fixed oscillator D′. The desired balanced mixer output is then delivered to a power amplifier F′ (preferably through pre-amplifying stages in practice) where it is modulated by voice sounds by the modulator G′. With the switch O′ in transmitting position, as illustrated, the antenna and loading network H′ and the antenna are connected to the output of the power amplifier F′ and the modulated waves are transmitted. The use of the balanced mixer R′ for combining the wave outputs of the multiplier B′ and the fixed oscillator D′ enables suppression of stronger undesired spurious waves.

On the other hand, when the change-over switches are all thrown to the receiving position shown in dotted lines, the antenna system H′ is connected to the input of the RF amplifier J′; the output of the multiplier B′ is connected to another mixer S′; and the output of the fixed oscillator D′ is made available for beat note oscillator purposes, this latter use being under the control of the switch N′. Removal of the fixed oscillator output from those parts of the circuit where it has any effect on the output of the multiplier B′ effects a displacement of the desired waves by the desired fixed frequency, and the displaced waves are heterodyned with the incoming signal in the mixer S′, the desired resultant intermediate frequency waves being then amplified in the intermediate frequency amplifier K′, demodulated in the detector L′, and given further amplification in the audio amplifier M′. It will be noted that the system just described differs from that shown in Figure 1 primarily in the use of two separate mixers R′ and S′ in place of the single mixer C shown in Figure 1; and in making R′ a balanced mixer to suppress certain undesired components which would otherwise appear as spurious radiations during transmission.

Referring now more particularly to the circuit diagram of Figure 3 (comprising portions 3*a* and 3*b*) the portions corresponding to the various rectangles and switches of the block diagram of Figure 2 are similarly lettered. The tunable oscillator A′ is shown as comprising a tube 10, which may be of tube type No. 6SJ7, having a tank circuit comprising a permeability tuned variable inductance 11 and a fixed condenser 12. While the tuned tank circuits throughout the system are shown as having fixed condensers (fixed except for such slight variations as may be desirable for trimming purposes) and variable inductances, it will be understood that the principles of operation of my system are equally applicable to circuits where the inductances are fixed and are tuned by variable condensers.

The output of the oscillator A′ is here shown as coupled to a grid of the multiplier B′, here shown as comprising the tube 13, which may also be of tube type No. 6SJ7, and its associated tuned circuits. The tank circuit in the output of the tube 13 is here shown as comprising the variable or tunable coil 14 having selectively associated therewith (in accordance with the position of the band switch 15) a selected one of the fixed condensers 16*a*—*c*. The selected output of the multiplier B′ is delivered to the change-over switch Q′ which is adapted to supply the waves thus generated to the balanced mixer R′ during transmission (through the wire *b* leading from Figure 3*a* to Figure 3*b*), when the switch is in the position shown in solid lines, or to the mixer S′ in the receiving portion of the system when the switch is in the position shown in dotted lines.

Figure 3A:
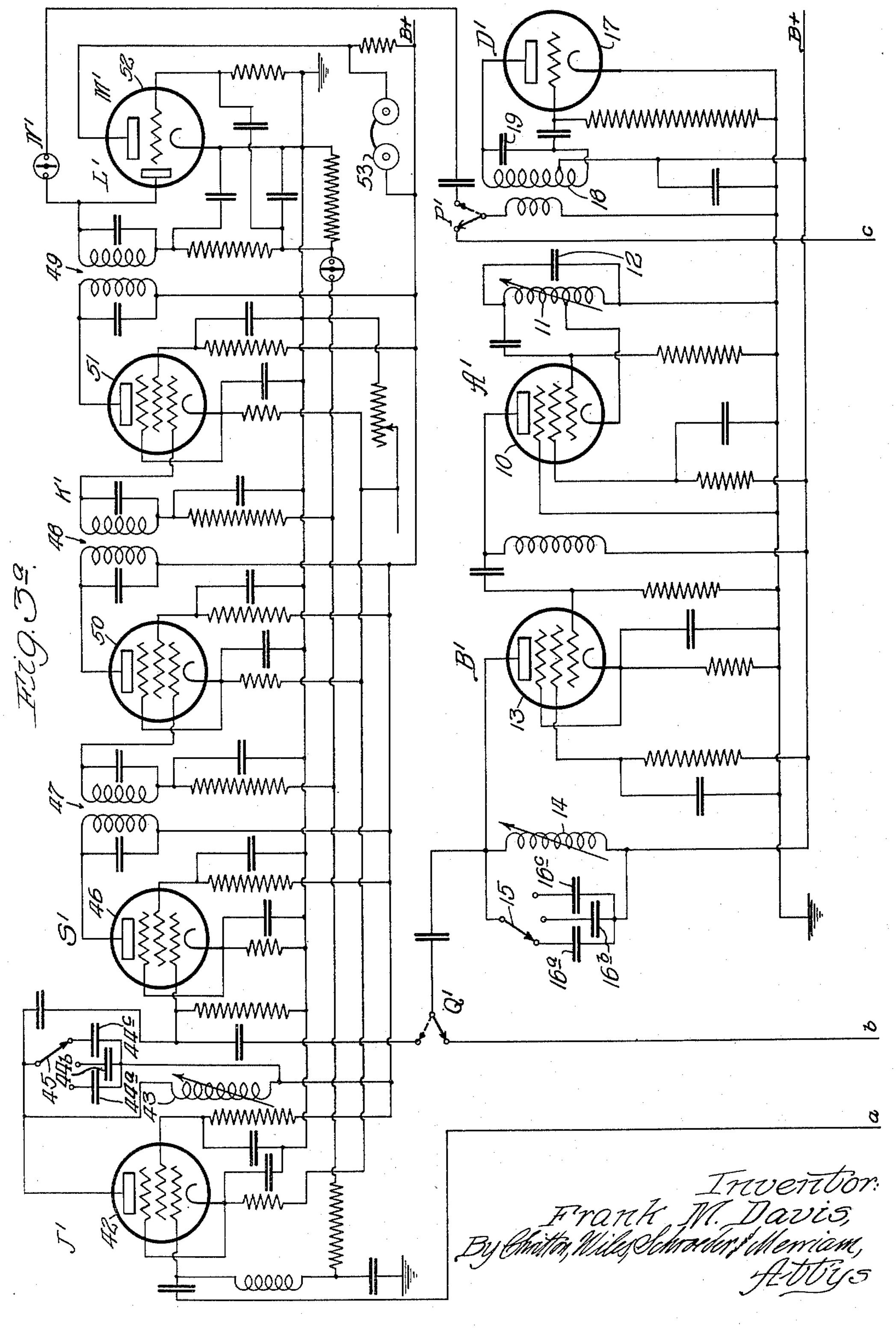
Figure 4:
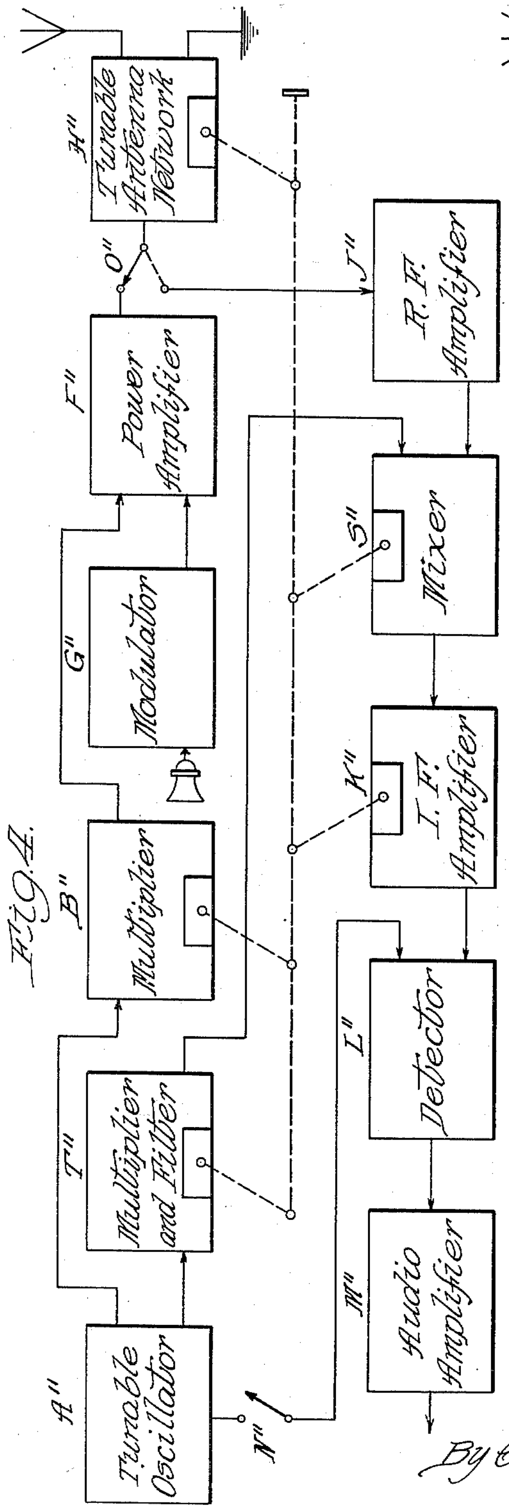

Still referring to Figure 3*a*, the fixed oscillator D′ is also adapted to supply waves to the balanced mixer R′ during transmission. This fixed frequency generator D′ is here shown as comprising the tube 17, which may be of tube type No. 6J5, having associated therewith a tank circuit comprising the fixed inductance 18 and the fixed condenser 19, it being understood that in practice a crystal may be used in conventional manner to stabilize the oscillator at the desired frequency, as 455 kc. The output of this fixed oscillator is connected to the movable element of the change-over switch P′ where it is adapted, when the switch is in the position shown in solid lines, to be delivered to the balanced mixer through the wire *c* forming one of the connections between the portions 3*a* and 3*b* of the circuit diagram. In the other or dotted line position of the change-over switch used during reception, the output of the fixed oscillator is delivered to one terminal of the on-off switch N′ having its other terminal connected to the anode of the detecting arrangement L′, so that the fixed frequency oscillator may be used as a beat frequency oscillator when the switch N′ is in the on position.

Figure 3B:
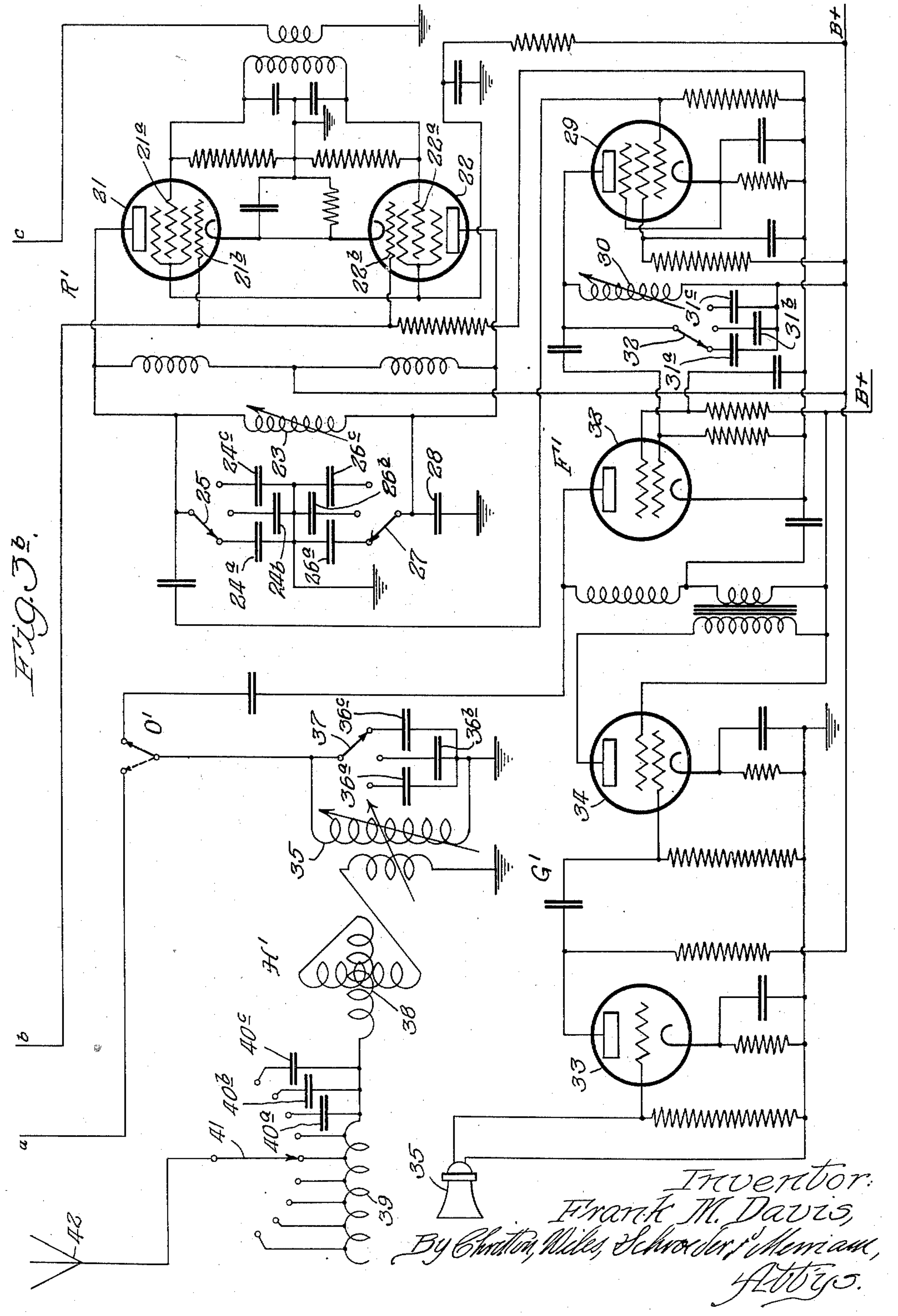

Assuming that the change-over switches are all in the transmitting position (as illustrated in solid lines), and referring now more particularly to Figure 3*b*, the operation of the system during transmission will be described. The balanced mixer R′ (which might also be termed a balanced modulator, although it is not so termed here because it is not performing the function of signal modulation) is here shown as comprising the tubes 21 and 22, which may be of tube type No.

6SA7, connected in conventional manner for balanced mixing. In this case the output of the fixed frequency oscillator D' (delivered through the wire *c*) is connected in push-pull to the grids 21*a* and 22*a* of these tubes; and the wave output of the multiplier B' (delivered through the wire *b*) is connected in direct or similar phase relationship to the grids 21*b* and 22*b*. It is found preferable to connect the tunable wave directly to the corresponding grids, and to keep its energy level substantially lower than that of the wave output of the fixed frequency oscillator. The plates of the tubes 21 and 22 are connected in push-pull relation to a tuned output circuit comprising the variable inductance 23 and two capacity systems connected to ground and to opposite sides of the coil 23. The upper capacity system (here so termed because of its position on the drawing) comprises the condensers 24*a*—*c*, selection of a different one of these condensers on each band being effected by the band switch 25. The other capacity system comprises a corresponding set of fixed condensers 26*a*—*c* selected by the band switch 27, and a condenser 28 used to balance the grid capacity of the succeeding tube into which this output system works.

This succeeding tube is a driver or pre-amplifier stage in the power amplifier F', here comprising the tube 29, which may be of tube type No. 6SJ7. The output circuit of this tube includes a tuned tank circuit comprising the variable inductance 30 and one of the condensers 31*a*—*c* selected by the band switch 32. While the distribution of these elements throughout the circuit diagram renders it impossible to indicate on the circuit diagram, it will be understood that all band switches in the system are ganged on a single shaft in conventional manner; that all change-over switches are synchronously operated as indicated in the block diagram of Figure 2, as by being relay operated or by being ganged on a single shaft; and that all of the variable elements in the tuned tank circuits are also appropriately ganged, as indicated in the block diagram of Figure 2, in conventional manner, so that they may be operated by a single tuning knob.

The output of the tube 29 is delivered to the power output stage here shown as comprising the tube 32, which may be a pliotron of tube type No. 807, although it will be understood in practice that power requirements will indicate the type of tube, the number of preamplifying stages, etc., in the power amplifier. The carrier wave delivered to the tube 32 by the preceding portions of the system, as described, is modulated in desired manner by plate modulation effected by a modulating arrangement here shown as comprising tubes 33 and 34. The space current of the tube 33 is here shown as affected by voice waves picked up by a microphone 35, although it will be understood that keying or other modulation may be used. The output of the tube 33, which may be of tube type No. 6J5, is delivered to the tube 34, which may be of tube type No. 807, for further power amplification and the desired modulating effect on the output of the tube 32.

The modulated output of the tube 32 is delivered, when the change-over switch O' is in the transmitting position shown in solid lines, to the antenna tank circuit comprising the variable inductance 35 and whichever one of the fixed condensers 36*a*—*c* is selected by the band switch 37. This is coupled, particularly where it is to be used with a relatively short antenna, as in aircraft work, to antenna loading means here shown as comprising a variometer 38 and an inductance or capacity provided by the tapped loading inductance 39 or the loading condensers 40*a*—*c* (selected by the tap switch 41) to the antenna here indicated diagrammatically as 42. The arrangement of this tuning and loading system between the change-over switch O' and the antenna 42 is very advantageous. This enables the tuning and loading means H' to be used for both transmission and reception, not only avoiding duplication of circuit elements but also enabling the system to be adjusted, during reception, so that transmission can be initiated, without further adjustment of the system, at very close to maximum possible power. This is, of course, highly important in radio equipment designed for naval aircraft, for example, where it is undesirable to break radio silence until the actual instant of transmission of an important message, it being undesirable to turn on the transmitter in advance and adjust the tuning and loading controls of the antenna system. With this arrangement, an airplane provided with my equipment can tune the radio apparatus to a transmitter on the frequency at which it is subsequently desired to transmit, as a transmitter at a home base. With the band and frequency thus determined by setting of the band switches and ganged tuning controls, the coupling between the coil 35 and its associated coil may be set from a chart, or set by starting with loose coupling and working up slowly to an approximately correct setting, as the coupling setting is not particularly critical; and then the loading control comprising the tap switch 41 and the variometer 38 may be adjusted until the loudest signal is being received. The antenna tuning and loading system is then properly adjusted, and throwing the system over to transmission enables going on the air with very close to the maximum power in the antenna. Operation in this manner has proved to provide antenna coupling and loading settings always providing at least 90% of the maximum power in the antenna possible by careful adjustment of the controls with the transmitter on, and generally in the neighborhood of 95% of this maximum power. Where it is desired to subsequently transmit on a predetermined frequency on which no station is sending, the same thing can be done by setting the band switches and tuning controls to the desired frequency as determined from the indicating means associated therewith, and using received noise as means for adjusting the coupling and loading controls.

When the change-over switches O', P' and Q' are in the receiving position indicated in dotted lines, the antenna tuning and loading system is connected (through the wire indicated as *a*) to the radio frequency amplifying portion J' of the receiver. This is here shown as comprising a tube 42, which may be of tube type No. 6SK7, having its input tuned by the tank circuit comprising the inductance 35 and one of the condensers 36*a*—*c* and its output tuned by the tank circuit comprising the variable inductance 43 and which ever one of the fixed condensers 44*a*—*c* is selected by the band switch 45. The output of this radio frequency stage and the output of the multiplier tube 13 (referring now more particularly to Figure 3*a*) are both delivered to a mixer or first detector here shown as comprising the tube 46, which may be of tube type No. 6SJ7. The desired one of the resultant waves, here assumed to be the difference between the incoming signal and the waves delivered by the tube 13, is then selected by the fixedly tuned intermediate frequency amplifier K' here shown as comprising the three fixedly tuned intermediate frequency transformers (tuned to 455 kc. under the conditions assumed earlier) 47, 48 and 49, and the tubes 50 and 51, which may be of tube type No. 6SK7. The output of the intermediate frequency amplifier is here shown as delivered to second detector and first audio amplifying arrangements incorporated in a single envelope in the tube here identified as 52, which may be of tube type No. 6SQ7. The rectified and amplified audio output is here shown as delivered to earphones 53, although it will be understood that in commercial practice additional stages of audio amplification might precede this translating device. If the incoming signal comprises code (CW), the desired audio note is provided by turning the switch N' to the on position to use the output of the tube 17 for beat frequency oscillator purposes, the tuning control being slightly detuned as described earlier. The reactance and resistance values, tube supply voltages, etc. would be determined in conventional manner by the frequency bands on which the apparatus is designed to operate, and by the type of tubes used and the function to be performed by the tube in each case, and will not be described in detail in connection with this particular system.

Another embodiment of my basic invention, one which I consider a preferred embodiment and which is believed by me to be superior to other specific embodiments of my basic concept, is illustrated in block diagram form in Figure 4 and in circuit diagram form in Figure 5, comprising portions 5*a*, 5*b* and 5*c*. This system achieves the desired displacement of locally generated frequency between transmission and reception by using different multiples of the basic frequency generated by a tunable oscillator. Under these conditions the difference between the initial and displaced frequencies is not a fixed frequency difference, but a ratio or percentage of the tunable oscillator frequency, so that the intermediate frequency amplifier in the receiving portion of the system must be tuned in synchronism with tuning of the oscillator. By using different multiples of the tunable oscillator frequency on transmission and reception, the frequency at which the tuned stages of the intermediate frequency amplifier must be peaked are always identical with the frequency being generated by the tunable oscillator. To simplify the ganging of the tuned circuits and enable exact synchronization and accurate tracking of the intermediate frequency tuned circuit with the oscillator tuned circuit, each of these circuits may be of exactly the same type and are designed to cover exactly the same frequency range. The coordination is effected by tracking of the variable reactance elements in the tank circuits, of course, and is not disturbed by the addition or substraction of fixed reactance of the opposite character in switching between bands, provided only that the reactance added or substracted is of the correct value.

Referring now more particularly to Figure 4, the block diagram, the tunable oscillator A'' delivers its wave output to the multiplier B'' and the multiplier and filter arrangement here identified as T''. The multiplier B'' could be combined with the multiplier T'' in practice, if desired, although it is believed preferable to use separate multiplier arrangements for transmission and reception, rather than switching in the same multiplier. The use of completely separate multipliers enables better isolation of the various parts of the circuit, and also enables switching to be done electronically by application or removal of plate voltage, rather than by use of a mechanical change-over switch. During transmission the desired multiple of the tunable oscillator frequency (which multiple may be anything from unity on up) is the carrier wave supplied to the power amplifier F'' and modulated by the desired signals by the modulator G''. When the change-over switch O'' is in the transmitting position shown in solid lines, the output of the power amplifier is delivered to the antenna system and its tuning and loading means here indicated as H''.

During reception the signal picked up by the antenna and passed through the tunable antenna network H'' is delivered (the change-over switch O'' now being in the dotted line position) to the radio frequency amplifier J''. The amplified signal is then delivered to the mixer S'' where it is heterodyned with locally generated waves of a desired frequency delivered from the tunable oscillator A'' through the multiplier and filter arrangement T''. The desired beat note, which may be the difference between the incoming and local heterodyning frequencies, is then passed through the intermediate frequency amplifier K'', demodulated in the detector L'', and further amplified in the audio amplifier M''. As in connection with the earlier systems, the tunable oscillator A'' may be used as a beat frequency oscillator by closing the switch N''.

It may be assumed that the oscillator A'' is so designed as to be variable over a range of 1,000 to 1,500 kc. Under these conditions, if it be designed to cover the frequencies lying between 2,000 and 6,000 kc., three bands would be provided, the multiplier B'' being arranged to double on the first band (2,000–3,000 kc.), triple on the next band (3,000–4,500 kc.), and quadruple on the third band (4,000–6,000 kc.). Under these conditions I find it satisfactory to provide only two different multiplying setups of the multiplier and filter arrangement T'', one tripling and the other quadrupling the basic frequency, as this is sufficient to enable a different multiple to be used on reception in each case than the multiple used for transmission.

If it be assumed that the tunable oscillator A'' was set at its lowest frequency setting and delivering a wave of a frequency of 1,000 kc., the wave output on the first band (with the multiplier B'' doubling) would then be 2,000 kc., this being passed through the power amplifier and transmitted. During reception, on the other hand, the multiplier T'' would be arranged to triple, so that the desired 2,000 kc. signal would be heterodyned with a local 3,000 kc. wave to give a beat note of 1,000 kc., the same as that originally generated in the tunable oscillator A''. Since the IF amplifier K'' is tuned to this frequency at this time (the tuning control not having been touched during the change-over from transmission to reception), the only signal reaching the antenna which will eventually reach the detector and audio amplifier is the desired 2,000 kc. signal. For the three bands assumed as representative, therefore, the oscillator would cover the frequency range of 1,000 to 1,500 kc. in each case, and the tuned circuit of the intermediate frequency amplifier would cover exactly this same range; while the multiplier outputs would differ in a manner necessary to provide the different desired frequencies to be transmitted and a different multiple (spaced by the oscillator frequency from the desired signal frequency) for local heterodyning purposes during reception, these conditions being shown in the following table:

| Band | Oscillator Frequency | Multiplier Output | Intermediate Frequency |
|---|---|---|---|
| 1. Trans | 1,000-1,500 | 2,000-3,000 | |
| 1. Rec | 1,000-1,500 | 3,000-4,500 | 1,000-1,500 |
| 2. Trans | 1,000-1,500 | 3,000-4,500 | |
| 2. Rec | 1,000-1,500 | 4,000-6,000 | 1,000-1,500 |
| 3. Trans | 1,000-1,500 | 4,000-6,000 | |
| 3. Rec | 1,000-1,500 | 3,000-4,500 | 1,000-1,500 |

Figure 5A:
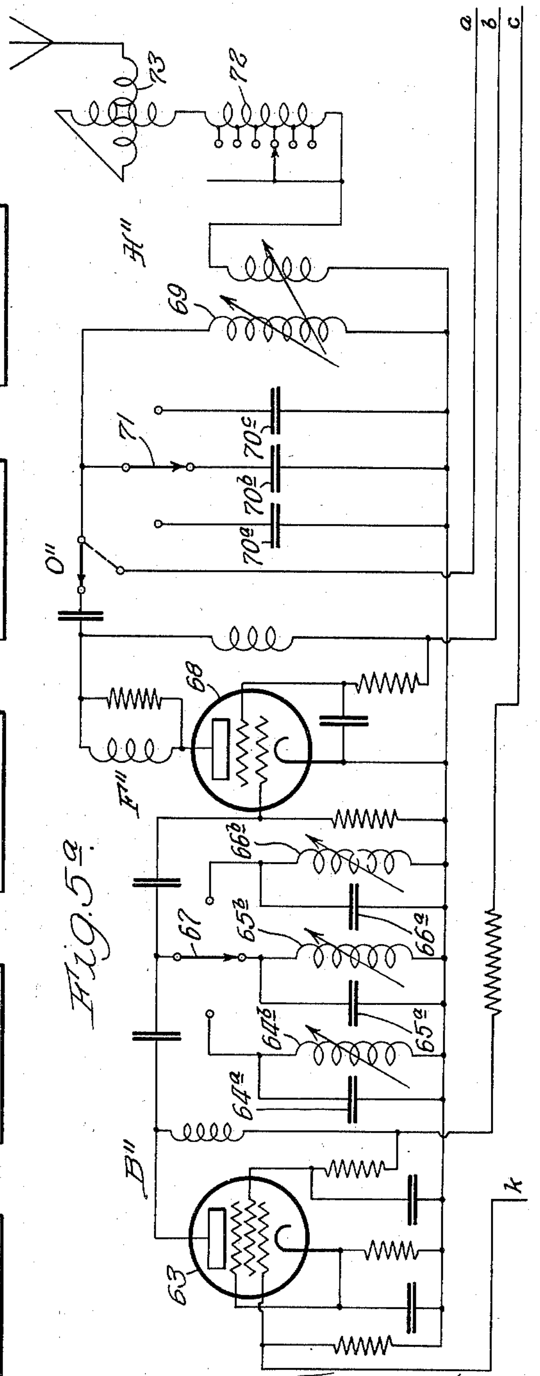

Referring now more particularly to the circuit diagram of Figure 5 (comprising portions 5*a*, 5*b* and 5*c*), a circuit for a system operating in accordance with the block diagram of Figure 4 will be described, the various portions of the circuit being lettered in correspondence with various portions of the block diagram of Figure 4. The circuit portion identified as Figure 5*a* makes connection through the wires or leads, identified as *a*, *b* and *c*, to the circuit portion identified as Figure 5*c*, and through the wire identified as *k* to the circuit portion identified as Figure 5*b*; and this latter portion makes connection, through the wires identified as *d—i*, to the portion identified as Figure 5*c*.

Figure 5B:
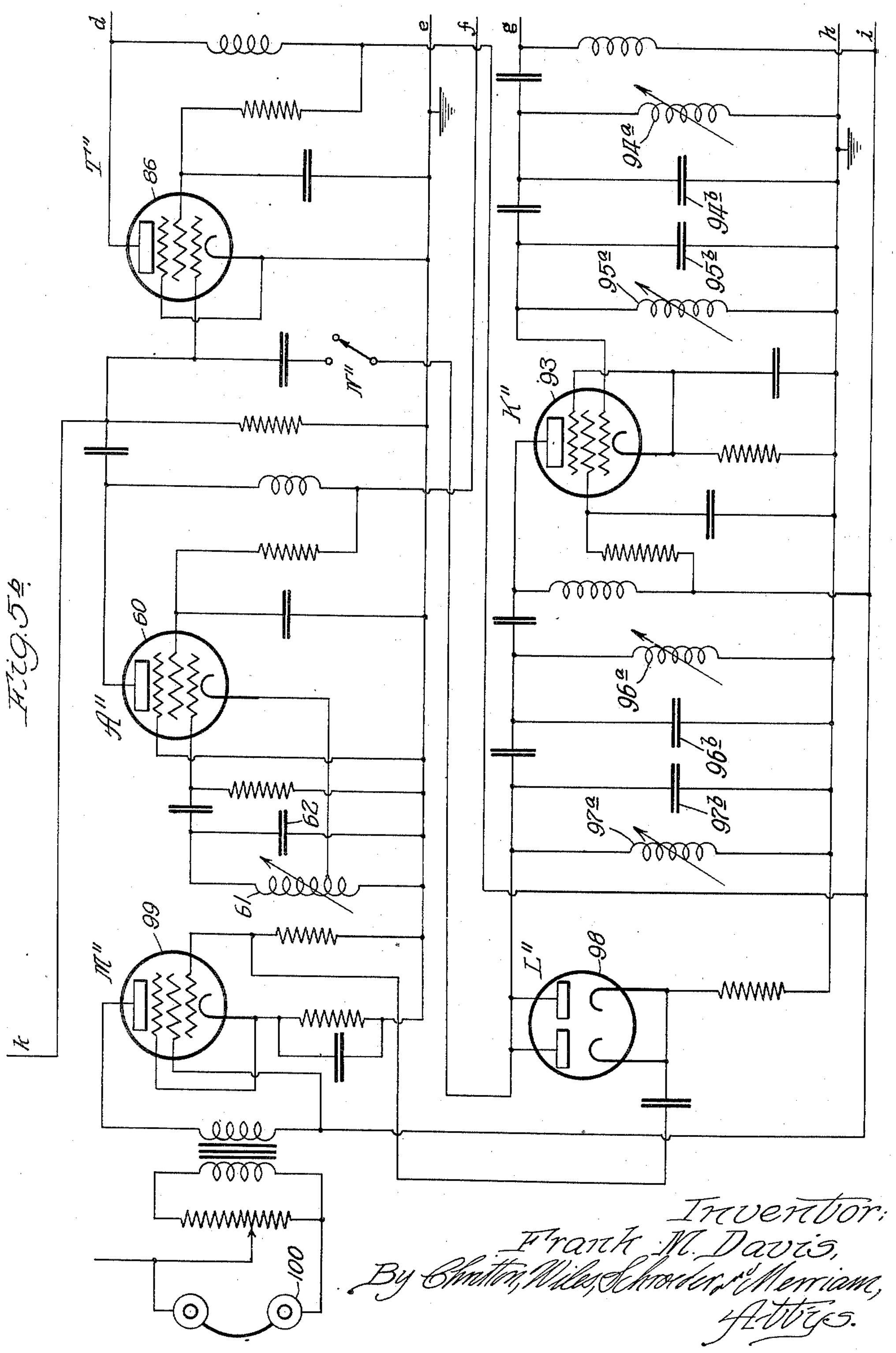
Figure 5C:
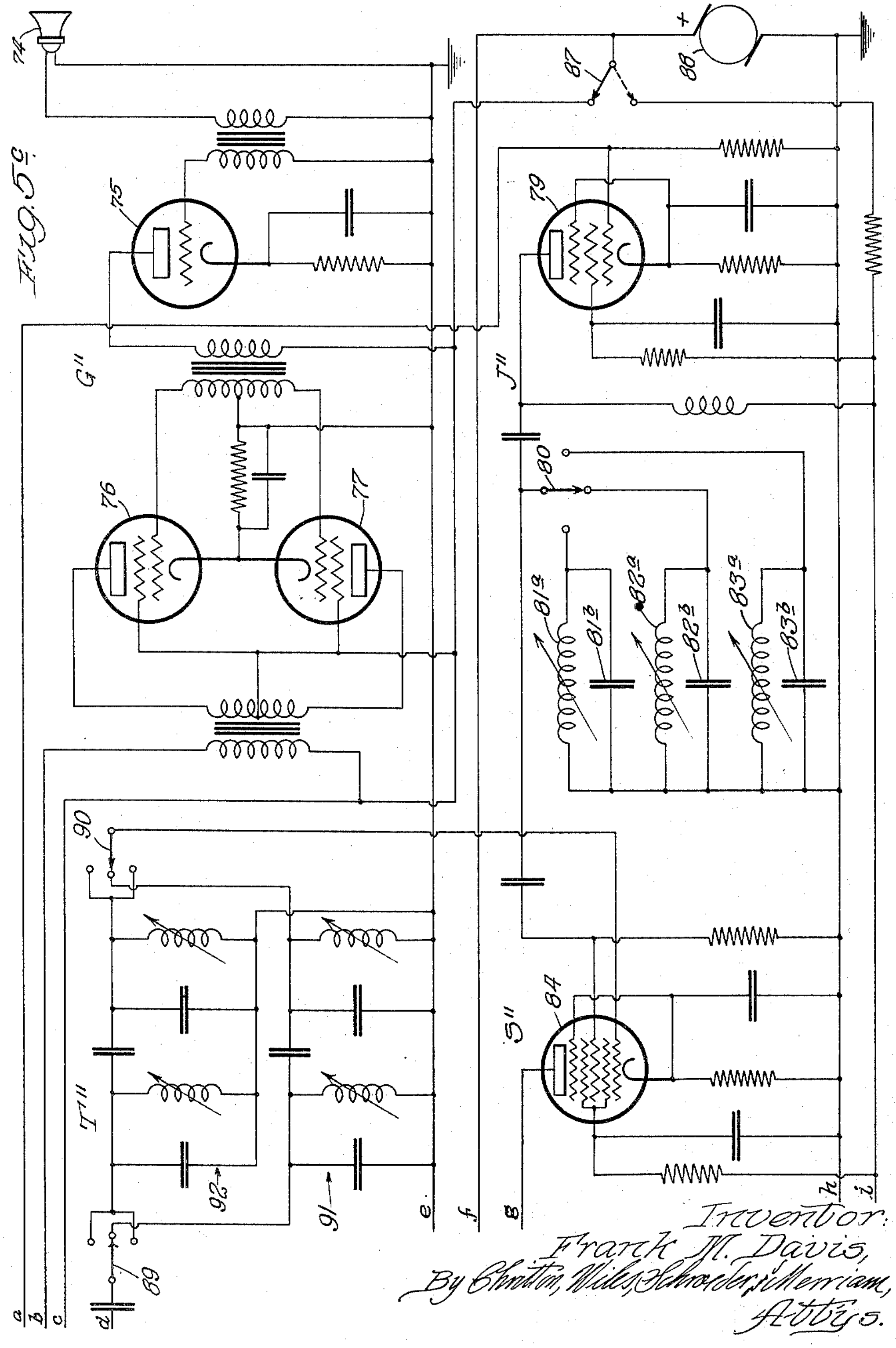

Referring now first to the center of the upper portion of Figure 5*b*, the oscillator A'' is here shown as comprising a tube 60, which may be of tube type No. 12SJ7, having a tuned tank circuit comprising the permeability tuned coil 61 and the fixed condenser 62. The output of this oscillator is delivered either to the multiplier and filter arrangement T'' or, through the wire *k*, to the multiplier B''.

Following out first this latter path, which would be used in transmission, and referring now more particularly to Figure 5*a*, it will be seen that the waves generated by the tunable oscillator are delivered to the input of a tube, here identified as 63, arranged for multiplication. The desired harmonic is selected by use of a particular one of the tuned tank circuits 64, 65 and 66 in the output of this stage, selection being effected by the band switch 67. While these tank circuits are shown as completely separate circuits comprising the fixed condensers 64*a*, 65*a* and 66*a* on the one hand, and permeability tuned coils 64*b*, 65*b* and 66*b* on the other hand, it will be understood that other arrangements could be used in practice. Similarly, while this multiplier is shown as comprising a single stage, it will be understood that it might in practice comprise two stages. This is true of all of the various sections of the circuit diagram, the number of tubes in each section generally being less than would be the case in actual commercial sets, which would generally have several stages of RF amplification, several stages of IF amplification, several stages of pre-amplification ahead of the last or power output stage for transmission, etc. Further following out the operation of the system during transmission, the desired multiple of the original wave provided by the multiplier B'' is delivered to a power amplifier here shown as comprising only a single stage comprising the tube 68, which may be of tube type No. 1625. When the change-over switch O'' is in the position shown in solid lines, the output of this tube is delivered to the antenna tank circuit here shown as comprising the variable inductance 69 and whichever one of the condensers 70*a—c* is selected by the band switch 71. The tank circuit is in turn coupled to the antenna system through appropriate loading means here shown as comprising the tapped coil 72 and the variometer 73. The band switches are all shown in the second position so that, if the tunable oscillator were set to deliver 1,000 kc., as assumed earlier, the transmitted frequency would be 3,000 kc. This carrier frequency would be combined with the desired signal by the modulator G'' shown in the upper right-hand corner of Figure 5*c*. Sounds supplied to the microphone 74 are delivered to the input of the first stage of the modulator, comprising the tube here identified as 75, which may be of tube type No. 12SF5. This tube is here shown as working into a push-pull output stage comprising a pair of tubes 76 and 77, which may be of tube type No. 1625. The output of these latter tubes is connected (through the wire *b*) in conventional manner for plate modulation of the power amplifier output.

When it is desired to receive on the same frequency as that on which transmission has taken place, a change-over from transmission to reception would be made without changing the tuning controls, this change-over including movement of the switch O'' from the position shown in solid lines in Figure 5*a* to the position shown in dotted lines. In this latter position signals received by the antenna system and subjected to at least preliminary selection in the tuned portion of the antenna network H'' are delivered (through the wire *a*) to the radio frequency amplifier J'' here shown as comprising the single tube 79 in the lower right-hand corner of Figure 5*c*, which tube might be of tube type No. 12SG7. The output of this tube includes one of three tuned tank circuits selected by the band switch 80, the tank circuits comprising the variable inductances 81*a*, 82*a* and 83*a* and the fixed condensers 81*b*, 82*b* and 83*b*, respectively. The waves subjected to preliminary selection by these tuned circuits in the input and output of the radio frequency amplifier are then delivered to the signal grid of the mixer tube here identified as 84, which may be of tube type No. 12SA7. Here it is heterodyned with what are being termed the displaced frequency desired waves, and the source of these waves will now be described.

Referring now briefly back to Figure 5*b*, it will be recalled that the wave output of the tunable oscillator A'' (comprising the tube 60 and its associated circuits) is also delivered to the other multiplier T'' not heretofore described. This multiplier is here shown as comprising a tube 86, which may be of tube type No. 12SG7, having its plate current supply derived from the wire at the very bottom of this figure (this wire being identified as *i*). Referring now more particularly to Figure 5*c* again, it will be seen that this plate supply lead wire is connected to one of two contact points of a plate supply change-over switch here identified as 87. The movable element of this two-position switch is synchronized with movement of the change-over switch O'', so that plate supply voltage from the generator 88 is delivered to the multiplier B'', the power amplifier F'' and the modulator G'' only when the system is conditioned for transmitting, when the switch is in the position shown in solid lines in this figure. On the other hand, when the switch is thrown to the dotted line position for reception, now being described, the other multiplier T''', and the various tubes in the receiving portion of the system, are energized. The wire identified as *f* provides plate voltage at all times for the oscillator A'', so that this operates during both transmission and reception. Throwing the system over to receiving condition, therefore, causes electronic switching from one multiple to another, so that the system can be conveniently arranged to provide a different multiplication of the basic oscillator frequency during reception from that used during transmission. The output of the multiplier tube 86 (Figure 5b) is delivered through the wire *d* and the band switches 89 and 90 to one of two chosen filter systems here shown as comprising only two stages, although in practice they would normally comprise five stages to secure the desired amount of attenuation of unwanted harmonics. With the band switches 89 and 90 in the second band position (3,000–4,500 kc.), the lower filter network here identified in general as 91 is operative, the output of this filter network being delivered to the injection grid of the mixer tube 84. Under the conditions assumed in the table given in connection with the description of the block diagram of Figure 4, this filter network would be arranged to quadruple when the set was operating on the second band (3,000–4,500 kc.), the variable reactance elements of this filter being ganged with the other tuned portions of the circuit to provide quadruple the frequency regardless of the setting of the tunable oscillator. The other or upper filter network, here identified in general as 92, is arranged for tripling and is operative on both the first and third bands described. In any case, the output of these filter networks is a multiple of the basic oscillator frequency one removed from that used during transmission, so that one of the resultant beat notes in the output of the mixer tube 84 is a frequency identical with that of the original tunable oscillator frequency.

Referring now more particularly to Figure 5b, it will be seen that the output of mixer tube 84 is delivered through wire *g* to the input of an intermediate frequency amplifier here shown as comprising only a single stage, although as has been mentioned before, several stages would be used in practice. This stage is here shown as comprising a tube 93, which may be of tube type No. 12SG7, with input and output tuning networks which are tunable and which are also ganged with the tuning of the oscillator A''. The input tuning is here shown as comprising two condenser coupled parallel tank circuits comprising the variable inductance 94*a* and the fixed capacity 94*b* on the one hand and the variable inductance 95*a* and fixed capacity 95*b* on the other hand; and the output is tuned by a similar network comprising the variable inductance 96*a* and fixed condenser 96*b* as one tank circuit and the variable inductance 97*a* and fixed condenser 97*b* as the other tank circuit. The output of the intermediate frequency amplifier is delivered to the detector stage comprising the rectifier tube 98, which may be of tube type No. 12H6, where the signal is demodulated and where it may be heterodyned against the original oscillator frequency for beat note purposes, if desired, by closing the switch N''. The detector output is then delivered to the audio amplifier M'', here shown as comprising only a single stage consisting of the tube 99, which may be of tube type No. 12A6, transformer coupled through a manually variable volume control to the translating device here shown as earphones 100.

An operative circuit of the character described, for the bands and frequency ranges previously assumed, might have the circuit element values which will now be described, inductance being given in microhenries, capacities in micro-microfarads and resistance in ohms. The permeability tuned oscillator tank circuit inductance 61 might be variable from 11–25.5; the transmitter multiplier inductances **64*b*, 65*b* and 66*b*** might vary from 17–7.8, 14–6.2 and 14–6.2, respectively. The antenna tank circuit coil 69 might be variable from 6.6–2.9; the tunable coils in the filter section 91 of the receiver multiplier, and the coil 83*a* in the RF amplifier might be variable from 7.3–3.3; the tunable coils in the section 92 of the receiver multiplier filter, and the coil 82*a* in the RF amplifier might be variable from 9.4–4.2; the first band coil 81*a* in the RF amplifier might be variable from 13.5–6; and the IF amplifier tuned coils **94*a*, 95*a*, 96*a* and 97*a*** might be variable from 59–26 microhenries. Under these circumstances the oscillator tank circuit condenser 62 might have a capacity of 1,000 micro-microfarads; the transmitter multiplier condensers 64*a*, 65*a* and **66*a*** might have capacities of 367, 200 and 113, respectively, for the bands assumed; the antenna network tank circuit condensers 70*a*, 70*b* and 70*c* might have capacities of 683, 261 and 208, respectively; the tank circuit condensers in the section 91 of the receiver multiplier filter, and the condenser 83*b* in the RF amplifier, might have capacities of 216; the tank circuit condensers in the filter section 92 of the receiver multiplier, and the condenser 82*b* in the RF amplifier, might have capacities of 300; the first band tank circuit condenser 81*b* in the RF amplifier might have a capacity of 466; and the tank circuit condensers 94*b*, 95*b*, 96*b* and 97*b* in the IF amplifier might have capacities of 430 micro-microfarads.

Other circuit constants would be of conventional value for the particular tubes used and the functions desired of those tubes. The coupling condensers in the oscillator input, the receiver multiplier output, and the RF amplifier might have a capacity of 100; the coupling condensers connecting the oscillator and the transmitter multiplier, the power amplifier and the antenna network, and the detector and AF amplifier might have a capacity of 2,000; and the coupling condenser between the transmitter multiplier tube and the band switch 67, and between that switch and the input of the power amplifier might be 500 and 800, respectively. The coupling condensers between sections of the filter networks in the receiver multiplier output, and those between the tank circuit sections in the intermediate frequency amplifier, might have a capacity of 10 micro-microfarads; while the coupling condensers between the tubes 84 and 93 and the tuned sections to which these tubes are coupled might be 350. The screen grid bypass condensers for the tubes 60, 63, 79, 84, 86 and 93, and the cathode resister bypass condensers for the tubes 79, 84 and 93, might have capacities of 10,000 micro-microfarads; and the cathode resister bypass condensers for the tubes 75, 76, 77 and 99 might have capacities of 4 microfarads. The oscillator screen grid and grid leak resisters might have values of 68,000 and 50,000 ohms, respectively; the tubes 79 and 93 might have screen grid resisters of 100,000 ohms each; the receiver multiplier tube 86 might have a screen grid resistance of 680,000 ohms; and the mixer tube 84, one of 330,000 ohms. The power amplifier tube 68 might have signal grid and screen grid resisters of 10,000 ohms each; the RF amplifier tube 79 might have a grid leak resister of one megohm, and the multiplier tube 86 a grid leak resister of 47,000 ohms; the modulator tubes 76 and 77 might have a single cathode bias resister of 125 ohms, and the tube 75 one of 1,600 ohms; and the tubes 79, 84, 93 and 99 might have cathode resisters of 100, 470, 150 and 1,600 ohms, respectively, while as much as one megohm, by-passed by 250 micro-microfarads, might be used in the cathode lead of the detector tube 98. It will be understood that these values are given as representative only to enable quicker and more convenient construction of radio apparatus conforming to the circuit shown in Figure 5; and that in practice these values would be varied in known manner depending upon the exact plate voltages used and other factors. Radio frequency chokes, blocking resisters, transformers, and other circuit elements not specifically described would follow conventional practice in connection with the particular function of the types of tubes specifically named as representative.

While I have shown and described certain embodiments of my invention, it is to be understood that it is capable of many modifications.

I claim:

1. Radio apparatus of the character described, including: tunable means for generating unmodulated waves of a first high frequency which may be continuously varied over a predetermined range; multiplying means operative upon said waves for providing first desired unmodulated waves of a high frequency comprising a predetermined multiple of said first frequency and second desired unmodulated waves of a high frequency comprising a different multiple of said first frequency; means for amplifying and transmitting one of the desired waves; and a super-heterodyne receiving system having an intermediate frequency amplifier tuned to the difference between the frequencies of the two desired waves, the desired waves which were not transmitted serving as the local heterodyning waves for said receiving system to provide for the reception of signals of the same frequency as the transmitted waves.

2. Radio apparatus of the character described, including: tunable means for generating waves of a first frequency variable over a predetermined range; multiplying means for providing first desired waves of a frequency comprising a predetermined multiple of said first frequency and second desired waves of a frequency comprising a different multiple of said first frequency; means for amplifying and transmitting one of the desired waves; and a super-heterodyne receiving system having a tunable intermediate frequency amplifier tunable over the same range as and coordinated with said tunable means, the other of said desired waves serving as the local heterodyning waves for said receiving system.

3. Radio apparatus of the character described, including: tunable means for generating waves of a first frequency variable over a predetermined range; multiplying means for providing first desired waves of a frequency comprising a predetermined multiple of said first frequency and second desired waves of a frequency comprising a different multiple of said first frequency; means for amplifying and transmitting one of the desired waves; a super-heterodyne receiving system having a tunable intermediate frequency amplifier tunable over the same range as and coordinated with said tunable means; and selectively operable means for connecting the multiplier to the amplifying means on the one hand and for providing a multiplication different by one from that used for transmission and connecting the multiplier to the receiving system on the other hand, whereby the waves resulting from said different multiplication serve as the local heterodyning waves for said receiving system.

4. Radio apparatus of the character described, including: tunable means for generating waves of a first frequency variable over a predetermined range; a first multiplier for providing first desired waves of a frequency comprising a predetermined multiple of said first frequency; a second multiplier for providing second desired waves of a frequency comprising a different multiple of said first frequency; means for amplifying and transmitting one of the desired waves; a super-heterodyne receiving system having a tunable intermediate frequency amplifier tunable over the same range as and coordinated with said tunable means; and selectively operable means for connecting the first multiplier to the amplifying means on the one hand and for connecting the second multiplier to the receiving system on the other hand, whereby the waves resulting from said different multiplication serve as the local heterodyning waves for said receiving system.

5. Apparatus of the character claimed in claim 4, wherein each of said multipliers is adapted to provide a plurality of multiplications and coordinating means causes said second multiplier to provide a multiplication different by one from that at which the first multiplier is operating.

6. Radio apparatus of the character described, including: tunable means for generating waves of a first frequency variable over a predetermined range; multiplying means for providing first desired waves of a frequency comprising a predetermined multiple of said first frequency and second desired waves of a frequency comprising a different multiple of said first frequency; an antenna system comprising an antenna and tuning means therefor; power amplifying means for amplifying one of the desired waves; a super-heterodyne receiving system having a tunable intermediate frequency amplifier tunable over the same range as and coordinated with said tunable means; and selectively operable means for connecting the multiplier to the input of the amplifying means and the antenna system to the output thereof on the one hand and for providing a multiplication different by one from that used for transmission and connecting the antenna system and the multiplier to the receiving system on the other hand, whereby the waves resulting from said different multiplication serve as the local heterodyning waves for said receiving system.

7. Radio communication apparatus of the character described, including: variable wave generating means for providing desired waves of an initial frequency variable over a predetermined range; means for providing other desired waves of a frequency displaced from the initial frequency, this means including said wave generating means; means for amplifying and transmitting one of the desired waves; a super-heterodyne receiving system having an intermediate frequency amplifier tuned to the difference between the frequencies of the two desired waves, the desired waves which were not transmitted serving as the local heterodyning waves for said receiving system, said system also having a second detector connected to said intermediate frequency amplifier; and a circuit including switch means for selectively connecting one of said two first mentioned means to said second detector for heterodyning the waves of said selected means with the intermediate frequency waves to provide a beat frequency note during reception of unmodulated signals.

8. Radio apparatus of the character described, including: variable wave generating means for providing desired waves of an initial frequency variable over a predetermined range; a second oscillator for generating waves of a fixed frequency; means for mixing said waves and providing, without variation of said tunable oscillator, other desired waves of a frequency displaced from the initial frequency by said fixed frequency; means for amplifying and transmitting one of the desired waves; a super-heterodyne receiving system having an intermediate frequency amplifier tuned to the difference between the frequencies of the two desired waves, the desired waves which were not transmitted serving as the local heterodyning waves for said receiving system, said system also having a second detector connected to said intermediate frequency amplifier; and a circuit including switch means for selectively connecting said fixed frequency oscillator to said second detector for heterodyning the waves generated by said fixed frequency oscillator with the intermediate frequency waves to provide a beat frequency note during code reception.

9. Radio apparatus of the character described, including: tunable means for generating waves of a first frequency variable over a predetermined range; multiplying means for providing first desired waves of a frequency comprising a predetermined multiple of said first frequency and second desired waves of a frequency comprising a different multiple of said first frequency; means for amplifying and transmitting one of the desired waves; a super-heterodyne receiving system having an intermediate frequency amplifier tuned to the difference between the frequencies of the two desired waves, the desired waves which were not transmitted serving as the local heterodyning waves for said receiving system, said system also having a second detector connected to said intermediate frequency amplifier; and a circuit including switch means for selectively connecting said tunable means to said second detector to provide a beat frequency note during code reception.

10. Apparatus of the character claimed in claim 3, wherein said receiving system also has a second detector connected to the intermediate frequency amplifier and wherein there is switch means for selectively connecting said tunable means to said second detector for heterodyning the waves generated by said tunable means with the intermediate frequency waves to provide a beat frequency note during reception.

11. Radio communication apparatus of the character described, including: a manually tunable oscillator for generating desired radio frequency waves of an initial frequency which may be varied uninterruptedly over a predetermined range; means associated with said oscillator for providing, without variation of said oscillator, other desired radio frequency waves of a frequency displaced from the initial frequency but bearing a predetermined relation thereto; means for amplifying and transmitting one of the desired waves; a super-heterodyne receiving system having an intermediate frequency amplifier tuned to the difference between the frequencies of the two desired waves, the desired waves which were not transmitted serving as the local heterodyning waves for said receiving system; and switching means for selectively rendering inoperable at least a portion of the amplifying means of the transmitting means during reception and at least a portion of the receiving system during transmission to provide for reception of signals of the same frequency as the transmitted waves.

12. Radio communication apparatus of the character described, including: a manually tunable radio frequency oscillator for generating desired waves of an initial frequency which may be varied uninterruptedly over a predetermined range; means associated with said oscillator for providing, without variation of said oscillator, other desired waves of a frequency displaced from the initial frequency by a predetermined frequency, this means including said tunable oscillator; means for amplifying and transmitting one of the desired waves; a super-heterodyne receiving system having an intermediate frequency amplifier tuned to the difference between the frequencies of the two desired waves, the desired waves which were not transmitted serving as the local heterodyning waves for said receiving system; and switching means for selectively deenergizing at least a portion of the amplifying means of the transmitting means during reception and at least a portion of said receiving system during transmission, to provide for reception of signals of the same frequency as the transmitted waves.

13. Radio communication apparatus of the character described, including: a manually tunable oscillator for generating desired radio frequency waves of an initial frequency which may be varied uninterruptedly over a predetermined range; means associated with said oscillator for providing, without variation of the manual tuning of said oscillator, other desired radio frequency waves of a frequency displaced from the initial frequency but bearing a predetermined relation thereto; means for amplifying and transmitting one of the desired waves; a super-heterodyne receiving system having an intermediate frequency amplifier tuned to the difference between the frequencies of the two desired waves, the desired waves which were not transmitted serving as the local heterodyning waves for said receiving system; and switching means for selectively rendering inoperable at least a portion of the electronic portion of the transmitting means during reception to provide for reception of signals of the same frequency as the transmitted waves.

FRANK M. DAVIS.

REFERENCES CITED

The following references are of record in the file of this patent:

UNITED STATES PATENTS

| Number | Name | Date |
|---|---|---|
| Re. 21,955 | Chaffee | Nov. 25, 1941 |

(Other references on following page)

UNITED STATES PATENTS

| Number | Name | Date |
|---|---|---|
| 1,506,580 | Hallborg et al. | Aug. 26, 1924 |
| 2,113,419 | Young | Apr. 5, 1938 |
| 2,144,936 | Rochow | Jan. 24, 1939 |
| 2,235,010 | Chaffee | Mar. 18, 1941 |
| 2,245,645 | Brown | June 17, 1941 |
| 2,252,870 | Slonczewski | Aug. 19, 1941 |
| 2,281,982 | Leyn | May 5, 1942 |
| 2,289,794 | Martin | July 14, 1942 |
| 2,317,547 | McRae | Apr. 27, 1943 |
| 2,327,248 | Case | Aug. 17, 1943 |
| 2,402,606 | Davis | June 25, 1946 |
| 2,427,670 | Goldsmith | Sept. 23, 1947 |

FOREIGN PATENTS

| Number | Country | Date |
|---|---|---|
| 221,566 | Germany | May 3, 1910 |
| 551,472 | Great Britain | Feb. 24, 1943 |

OTHER REFERENCES

"The A. R. R. L. Antenna Book," published 1942 by The American Radio Relay League, Inc., West Hartford, Conn., pages 138–141 relied on, pages 21–29 to show the state of the art.